April 17, 1962

E. J. CLARK ETAL 3,029,885

AUTOMATIC STEERING DEVICE

Filed April 15, 1957

INVENTORS
Earl J. Clark &
BY John A. Clements
J. C. Thorpe
ATTORNEY

April 17, 1962

E. J. CLARK ETAL 3,029,885

AUTOMATIC STEERING DEVICE

Filed April 15, 1957

INVENTORS
Earl J. Clark, E.
BY John Q. Clements

J. C. Thorpe
ATTORNEY

United States Patent Office 3,029,885
Patented Apr. 17, 1962

3,029,885
AUTOMATIC STEERING DEVICE
Earl J. Clark, Indianapolis, and John A. Clements, Brownsburg, Ind., assignors to General Motors Corporation, Detroit, Mich., a corporation of Delaware
Filed Apr. 15, 1957, Ser. No. 652,783
6 Claims. (Cl. 180—1)

This invention relates to a system of apparatus for application to an automotive vehicle equipped with power steering to accomplish automatically a "pre-set" maneuver, by which is meant a maneuver that must conform to a certain pattern determined by fixed conditions, e.g., a curve or curves in a driveway traversed daily incident to backing from a garage into a street, a parking maneuver, as where it is desired to position the vehicle parallel to a curb between two previously parked cars, etc.

The invention is considered particularly valuable as applied in connection with the last-mentioned operation, which even with the advent of power steering is accomplished by many individuals only with annoying difficulty, and with the expenditure of considerable time in many cases. The annoyance is not limited to the driver since the operation often delays traffic on busy city streets, and if prolonged increases the likelihood of mishaps of varying seriousness.

According to the invention, the parking of the vehicle or other maneuver is achieved with substantially no effort on the part of the driver and in a minimum of time.

Generally described, the apparatus herein comprises a mechanism, as a cam or equivalent instrumentality, which is operated in accordance with the amount of rotation of the road wheels and which controls electrical means in turn governing the action of the power steering control member as required to achieve the maneuver. In effect, the apparatus takes over the steering function from the operator during the maneuver, although it may be so designed that the operator can at any time overrule the apparatus if he desires. With the vehicle initially properly placed for the maneuver, the operator during the maneuver need operate only the accelerator and brake pedal; in fact, if the vehicle is equipped with an automatic transmission set to allow some "creep," the operator may be required only to manipulate the brake.

While utilizable with respect to substantially any power steering apparatus, the invention is considered especially significant as applied to a hydraulic power steering gear of the type wherein the control valve is actuated by reactionary axial thrust of the steering shaft. Such a gear is shown, for example, in Davis Patent No. 2,213,271 and in the U.S. Patent 2,827,123 to Clovis W. Lincoln et al., the latter patent being owned by the assignee herein.

Applied as just indicated, the invention is particularly distinguished in that the means governed by the previously mentioned cam or equivalent instrumentality is a pair of solenoids which operate to shift the steering shaft and hence to displace the control valve as necessary to effect the desired maneuver.

A preferred embodiment of the invention is illustrated by the accompanying drawings which will be referred to in the further description. In the drawings, FIG. 1 shows the parking operation wtih reference to which the particular apparatus was designed;

Figure 2:
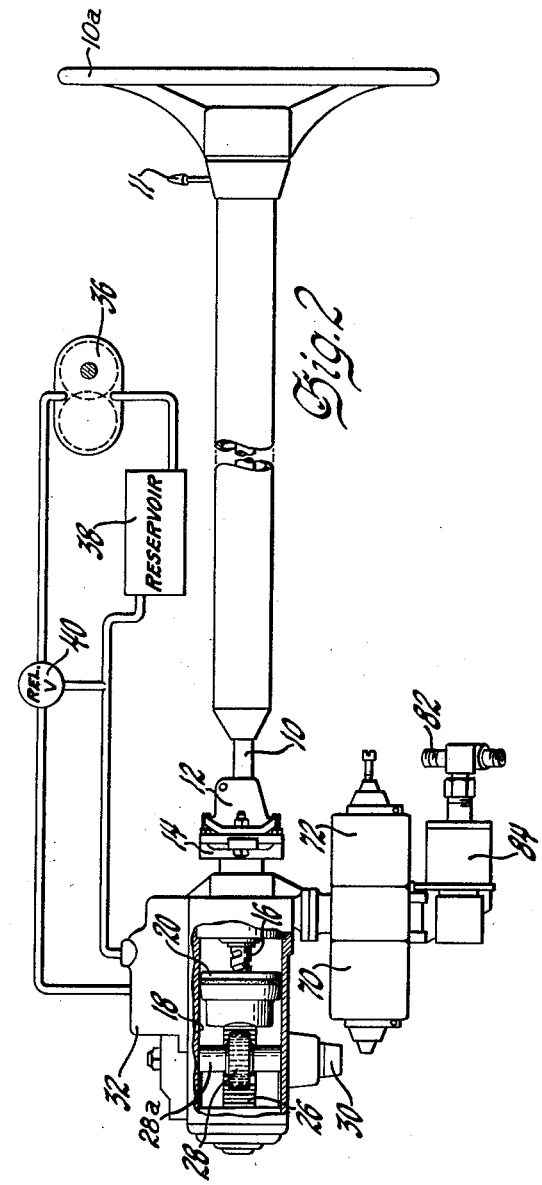
FIG. 2 shows the apparatus as installed.
Figure 3:
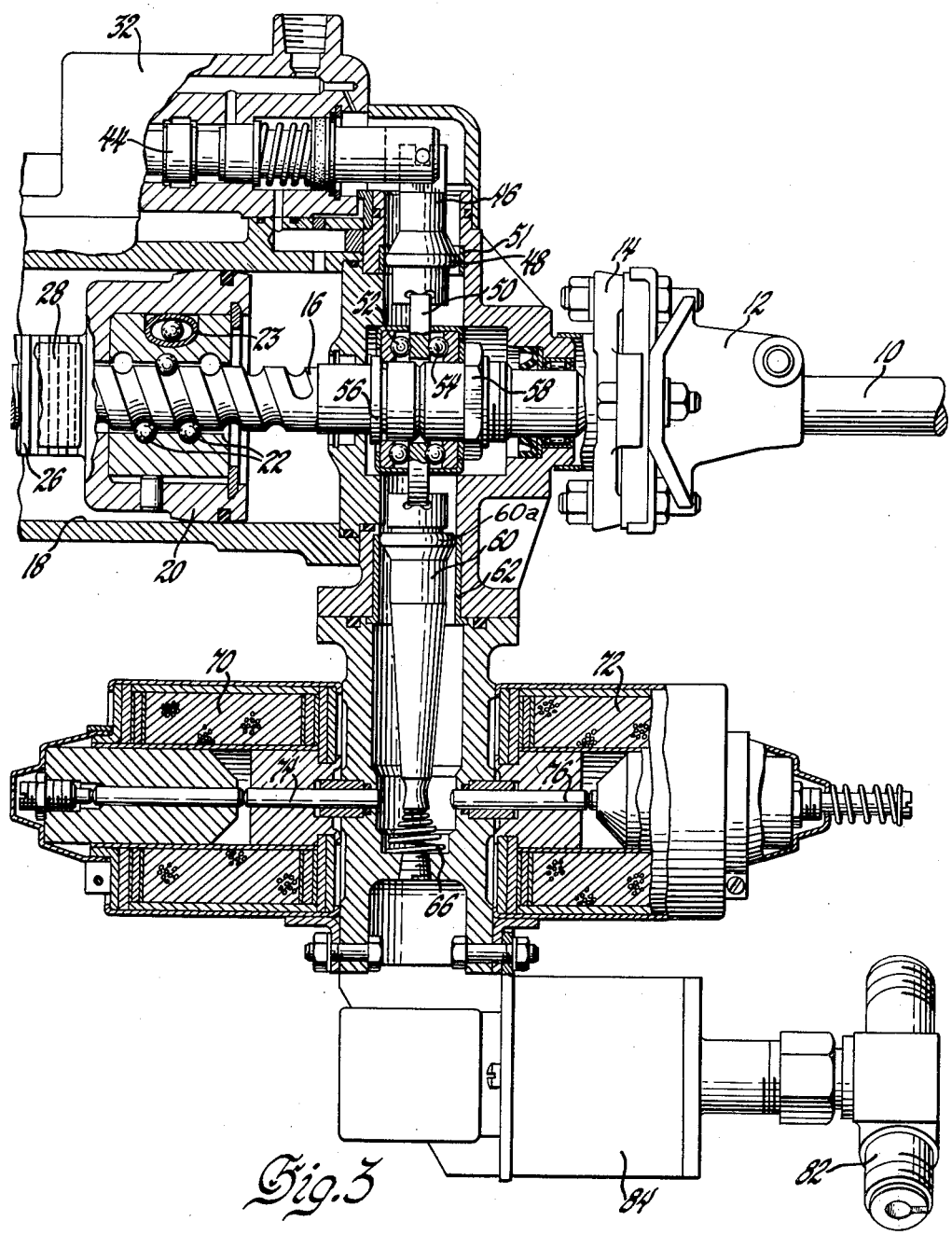
FIG. 3 is a view, partly in section and partly in elevation, showing the principal parts.

Referring first to FIGURE 2, the numeral 10 indicates a steering shaft carrying a steering wheel 10a and terminating in the upper component of a flexible coupling 12. The lower component 14 of such coupling, which avoids alignment problems in assembly and which operates to mitigate road shocks, may be pinned or splined, for example, to a worm shaft 16. The latter is confined by the hydraulic cylinder 18 and is accommodated within the power piston 20, which is internally grooved to complete the course for the balls 22 (FIG. 3). One of these balls will be seen in the return tube 23, completing the helical circuit.

Piston 20 has a rack portion 26, the teeth of which mesh with a gear sector 28 integral with a cross-shaft 28a through which pitman 30 is actuated.

Mounted on the cylinder 18 is the housing component 32 of the control valve which governs the flow of hydraulic fluid to and from the cylinder 18. The pressure fluid is supplied by a pump 36 drawing from a reservoir 38. A pressure relief valve 40 operates to connect the discharge and suction sides of the pump should pressure in the system become excessive.

The movable component 44 of the control valve has the form of a spool and in normal operation of the steering gear is displaced axially by reactionary axial thrust of the worm shaft 16 to create pressure differentials across the piston 20. Lever 46, through which the valve is displaced, has an enlarged portion 48 engaging the surrounding wall or more accurately a bushing 51. With such arrangement, it should be clear that axial movement of the worm shaft is accompanied by rocking of the lever, the direction of the rocking depending on the direction of movement of the shaft.

The apparatus so far described forms no part of the present invention, being the subject-matter of the patent to Clovis W. Lincoln et al. above identified. As the content of such application is to be taken as incorporated in this application by reference, further description of the basic gear herein is not believed necessary. Suffice it to say that the axial movement of the worm 16 (or steering shaft—in the absence of a flexible coupling), bringing about actuation of the control valve is reactionary, i.e., induced by the turning of the steering wheel against the load represented by the steering resistance.

Figure 4:
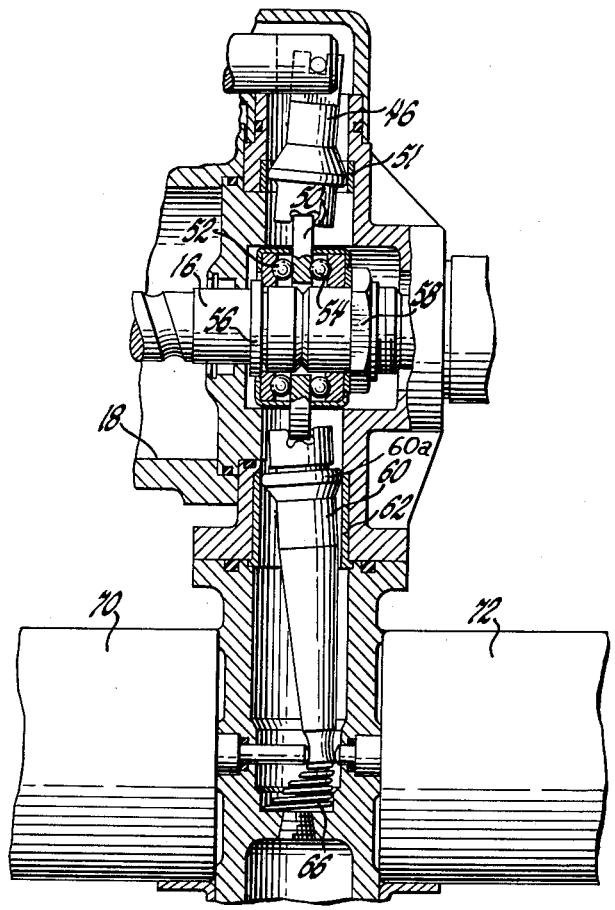
FIG. 4 is a detail illustrating the operation of such parts.

As shown in the drawings (FIGS. 3 and 4), the lever 46 is operably connected to the steering shaft via an annular member 50 encircling the shaft between a pair of thrust bearings 52, 54. The bearing 52 shoulders against a flange 56 carried by the steering shaft, being maintained thereagainst by the nut 58 threaded on the shaft in abutting relation to bearing 54. Below the thrust bearings the member 50 operably connects to a lever 60, similar to lever 46, but longer. Also, like the lever 46, the lever 60 has an enlarged portion 60a engaging a bushing 62 so that it is adapted to rock in the general manner of lever 46. A spring 66 acts to insure maintenance of the connection with the member 50 and also has a centering action.

Located at either side of the lever 60 is a solenoid 70, 72 having an armature plunger 74, 76 respectively. On energization of either solenoid, (FIG. 4) the corresponding plunger engages with the lever 60 to rock the same, thereby moving the steering shaft 10 up or down as the case may be.

It is important to observe at this point that the clearance between each plunger 74, 76 and the corresponding side of the lever 60 is such that with the solenoids deenergized, as shown, there can be no interference with the normal operation of the power steering gear.

Figure 1:
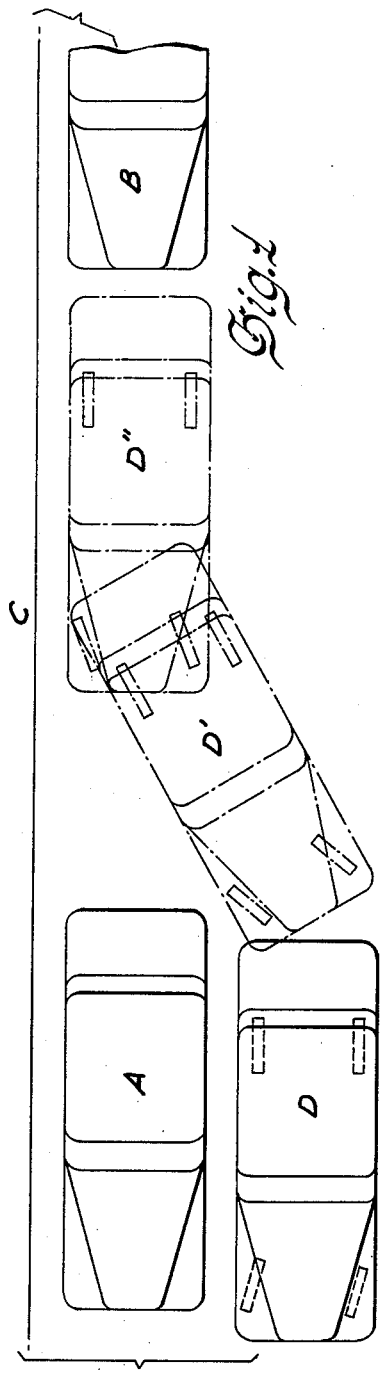
Figure 5:
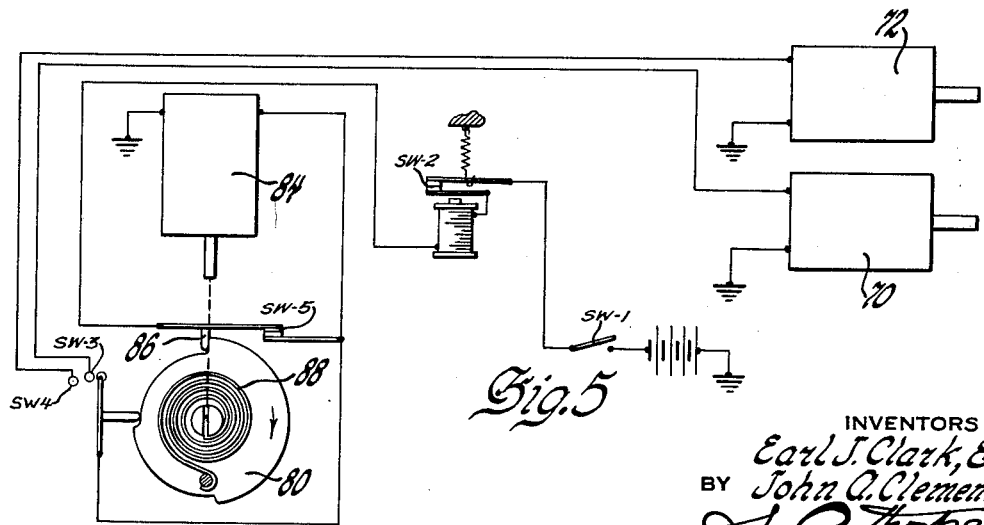
FIG. 5 is a schematic representation of the electric circuitry.

In the interest of facilitating an understanding of the invention, it is now believed advisable to refer to the operation of the apparatus with reference to the wiring diagram (FIG. 5). As previously indicated, the sequence of operations illustrated by FIG. 1 is automatically brought about by a cam or equivalent instrumentality denoted by the numeral 80. This cam is advantageously driven by a take-off from the speedometer drive (note fixture 82 in FIG. 3) and is under the control of a solenoid 84 governing a clutch which, when engaged, operably connects the cam to the take-off shaft for rotation thereby. The cam is normally in its shown position, being held against a stop 86 by a spring 88.

A cam assembly which has been found suitable for commercial use is shown in co-pending application Serial No. 568,010, filed February 27, 1956 in the names of George B. Meginnis and John A. Clements and owned by the assignee herein. In view of the disclosure of such application, it is not deemed necessary to supply a detailed description of the assembly herein.

Let it be assumed now, that the vehicle (FIG. 1) has been brought to a position D where it is located approximately 2½ feet from the side of the car A at curb C and about 1 foot forward of the rear bumper of car A. With the vehicle so positioned, the transmission control lever 11 (FIG. 2) is placed in reverse, causing closing of switch SW1. Thereafter, a knob in the driver's compartment is turned to close holding switch SW2, energizing the circuits. With the circuits energized, the solenoid 84 effects clutching of the cam 80 to the take-off from the speedometer drive shaft, bringing about clockwise rotation of the cam, as indicated by the arrow. As should be readily seen, rotation of the cam is accompanied by sequential closing of switches SW3 and SW4. Closing of switch SW3 applies potential to the solenoid 70 which operates through its plunger 74 and the lever 60 to move the steering shaft 10 axially downwardly. Such movement of the steering shaft results in clockwise rocking or swinging of the lever 46 and rightward or upward movement of the valve spool 44. A buildup of pressure consequently occurs in the lower portion of the cylinder 18, moving the power piston 20 upwardly as necessary to turn the dirigible wheels to the right. With the wheels so turned, the operator (keeping his hands off the steering wheel) depresses the accelerator and the vehicle moves rearwardly, the front end thereof swinging outwardly as required. Since cam 80 rotates in correspondence with the amount of rotation of the road wheels, switch SW3, at the proper time, becomes open and switch SW4, controlling the solenoid 72, becomes closed to effect leftward swinging of the dirigible wheels (position D″, FIG. 1).

The dirigible wheels are maintained swung to the left throughout the stage represented by positions D′ and D″. Straightening of such wheels to center the vehicle between cars A and B is accomplished with the normal power assist.

Clutch-control solenoid 84 remains energized until switch SW5 is opened by the cam 80 with the vehicle in position D″. Opening of such switch is brought about by engagement of the cam surface with the underside of the stop 86. On the opening of switch SW5, switch SW2 springs open to assume its normal position shown. Also on the opening of switch SW5, spring 88, which winds up incident to the clockwise rotation of the cam, spins the cam counterclockwise to its shown position against the stop 86.

On the foregoing, it should be clear that the invention provides a simple and inexpensive way to obtain the benefits of automatic parking in a power steering-equipped car at every little expense. Additionally, the invention is advantageous in that the apparatus is very compact, rugged in construction and easily accessible.

What is claimed is:

1. In an automotive vehicle having a steering wheel or the equivalent and equipped with a power steering gear including a control component governing the power means, said control component being normally actuated by reaction of a steering member to the load represented by the steering resistance, the combination of apparatus whereby said power steering gear may be utilized in the accomplishment of a pre-set maneuver without the imposition of manual effort at said steering wheel or the equivalent, said apparatus comprising control means adapted to operate in accordance with the amount of rotation of the road wheels of the vehicle, and electrically motivated means governed by said control means and operably associated with said steering member through mechanical linkage means to move the same as necessary to displace said control component and bring said power means into play as required for the maneuver.

2. In an automotive vehicle having a steering shaft member and equipped with a power steering gear including a control component governing the power means, said control component being normally actuated by reaction of the steering shaft member to the load represented by the steering resistance, the combination of apparatus whereby said power steering gear may be utilized in the accomplishment of a pre-set maneuver without the application of manual effort to said steering shaft member, said apparatus comprising control means adapted to operate in accordance with the amount of rotation of the road wheels of the vehicle, and a pair of solenoids governed by said control means and operably associated with said steering shaft member through mechanical linkage means to move the same as necessary to displace said control component and bring said power means into play as required for the maneuver.

3. In an automotive vehicle having a steering shaft member and equipped with a power steering gear including a control component governing the power means, said control component being normally actuated by reactionary axial movement of said steering shaft member, the combination of apparatus whereby said power steering gear may be utilized in the accomplishment of a pre-set maneuver without the application of manual effort to said steering shaft member, said apparatus comprising control means adapted to operate in accordance with the amount of rotation of the road wheels of the vehicle, and a pair of solenoids governed by said control means and operably associated with said steering shaft member through forces multiplying mechanical linkage means to axially move the same as necessary to displace said control component and bring said power means into play as required for the maneuver.

4. In an automotive vehicle having a steering shaft member and equipped with a power steering gear including a hydraulic motor and a control valve therefor, said valve being normally actuated by reactionary axial movement of said steering shaft member, the combination of apparatus whereby said power steering gear may be utilized in the accomplishment of a pre-set maneuver without the application of manual effort to said steering shaft member, said apparatus comprising cam control means rotated in accordance with the amount of rotation of the road wheels of the vehicle, a pair of solenoids governed by said cam control means through a plurality of switches associated therewith and mechanical linkage means operably associated with said solenoids and with said steering shaft member, each of said solenoids when energized serving to axially move said steering shaft member as necessary to displace said control valve and bring said power means into play.

5. In an automotive vehicle equipped with a power steering gear including a hydraulic motor and a control valve therefor, said vehicle having a bipartite steering shaft including an upper section and a lower worm section joined to said upper section via a flexible coupling, said valve being normally actuated by reactionary axial movement of said worm section, the combination of apparatus whereby said power steering gear may be utilized in the accomplishment of a pre-set maneuver without the application of manual effort to the steering shaft, said apparatus comprising cam control means rotated in accordance with the amount of rotation of the road wheels of the vehicle, a pair of solenoids governed by said cam control means through a plurality of switches associated therewith and force-multiplying mechanical linkage means operably associated with said solenoids and with said worm section each of said solenoids when energized serving to axially move said worm section as necessary to displace said control valve and bring said motor into play.

6. In an automotive vehicle equipped with a power steering gear including a hydraulic motor and a control valve therefor, said vehicle having a bipartite steering shaft including an upper shaft section and a worm section joined to said upper shaft section via a flexible coupling, said valve being normally actuated by reactionary axial movement of said worm section and being connected thereto by lever means, the combination of apparatus whereby said power steering gear may be utilized in the accomplishment of a pre-set maneuver without the application of manual effort to the steering shaft, said apparatus comprising cam control means rotated in accordance with the amount of rotation of the road wheels of the vehicle and a pair of solenoids governed by said cam control means through a plurality of switches associated therewith, each of said solenoids being adapted when energized to axially move said worm section as necessary to displace said control valve and bring said motor into play, such movement of said valve being effected through lever means common to said solenoids and separate from said first lever means.

References Cited in the file of this patent
UNITED STATES PATENTS

| | | |
|---|---|---|
| 748,252 | Anderson | Dec. 29, 1903 |
| 2,213,271 | Davis | Sept. 3, 1940 |
| 2,424,288 | Severy | July 22, 1947 |
| 2,827,123 | Lincoln | Mar. 18, 1958 |